United States Patent [19]
Komori et al.

[11] Patent Number: 6,108,628
[45] Date of Patent: Aug. 22, 2000

[54] SPEECH RECOGNITION METHOD AND APPARATUS USING COARSE AND FINE OUTPUT PROBABILITIES UTILIZING AN UNSPECIFIED SPEAKER MODEL

[75] Inventors: Yasuhiro Komori, Kawasaki; Tetsuo Kosaka, Zama; Masayuki Yamada, Kawasaki, all of Japan

[73] Assignee: Canon Kabushiki Kaisha, Tokyo, Japan

[21] Appl. No.: 08/931,527

[22] Filed: Sep. 16, 1997

[30] Foreign Application Priority Data

Sep. 20, 1996 [JP] Japan .................................. 8-249972

[51] Int. Cl.$^7$ .................................................. G01L 15/14
[52] U.S. Cl. ............................................ 704/256; 704/238
[58] Field of Search .................................... 704/256, 245, 704/243, 238, 200, 240, 241, 231, 249, 254, 255

[56] References Cited

U.S. PATENT DOCUMENTS

| | | | |
|---|---|---|---|
| 4,837,831 | 6/1989 | Gillick et al. | 704/245 |
| 4,914,703 | 4/1990 | Gillick | 704/245 |
| 5,208,863 | 5/1993 | Sakurai et al. | 381/43 |
| 5,220,629 | 6/1993 | Kosaka et al. | 381/52 |
| 5,271,088 | 12/1993 | Bahler | 704/200 |
| 5,369,728 | 11/1994 | Kosaka et al. | 395/2.63 |
| 5,598,507 | 1/1997 | Kimber et al. | 704/246 |
| 5,606,643 | 2/1997 | Balasubramanian et al. | 704/243 |
| 5,608,840 | 3/1997 | Tsuboka | 704/236 |
| 5,608,841 | 3/1997 | Tsuboka | 704/256 |
| 5,621,849 | 4/1997 | Sakurai et al. | 395/2.5 |
| 5,659,662 | 8/1997 | Wilcox et al. | 704/238 |
| 5,787,394 | 7/1998 | Bahl et al. | 704/238 |
| 5,839,105 | 11/1998 | Ostendorf et al. | 704/256 |

OTHER PUBLICATIONS

Kosaka et al., "Tre Structured Speaker Clustering for fast Speaker Adaptation Proceedings of ICCASSP". vol. 1, pp. 1245–1248, Apr. 1994.

Kosaka, T, et al., Tree–Structured Speaker Clustering For Fast Speaker Adaption, Proceedings of ICASSP, vol. 1, Apr. 1994, pp. 1245–1248.

G. Rigoll, "Speaker Adaptation for Large Vocabulary Speech Recognition Systems Using 'Speaker Markov Models'", Proceedings of ICASSP, vol. 1 No. 14, May 1989, pp. 5–9.

Sugiyama, et al., "Speech Segmentation and Clustering Problem Based on an Unknown–Multiple Nu Signal Source Model/An Application to Segmented Speech Clustering Based on Speaker Features", Systems & Computers in Japan, vol. 25, No. 9, Aug. 1994, pp. 83–92.

*Primary Examiner*—Richemond Dorvil
*Attorney, Agent, or Firm*—Fitzpatrick, Cella, Harper & Scinto

[57] ABSTRACT

A high-speed speech recognition method with a high recognition rate, utilizing speaker models, includes the steps of executing an acoustic process on the input speech, calculating a coarse output probability utilizing an unspecified speaker model, and calculating a fine output probability utilizing an unspecified speaker model and clustered speaker models, for the states estimated, by the result of coarse calculation, to contribute to the results of recognition. Candidates of recognition are then extracted by a common language search based on the obtained result, and a fine language search is conducted on the thus extracted candidates to determine the result of recognition.

32 Claims, 8 Drawing Sheets

SPEECH PERCEPTION WITH SPEAKER CLASS HMM (%)

| SPEAKER CLASS | HI-SPEED | top1 | top3 | MEAN IMPROVEMENT | MAXIMUM DETERIORATION | BEST IMPROVEMENT |
|---|---|---|---|---|---|---|
| g1 (BASELINE) | YES | 88.7 | 96.4 | — | — | — |
| g2 (SEX-FIXED) | YES | 90.0 | 96.4 | 1.4 | −13.5 | 7.6 |
| g2 (LIKLIHOOD-SELECTED) | YES | 90.5 | 96.7 | 1.9 | −5.8 | 7.6 |
| g8 (LIKLIHOOD-SELECTED) | YES | 90.5 | 96.4 | 1.8 | −10.6 | 11.5 |
| g1+g2 (LIKLIHOOD-SELECTED) | YES | 90.4 | 96.6 | 1.7 | −2.9 | 5.8 |
| g1+g8 (LIKLIHOOD-SELECTED) | YES | 91.2 | 96.8 | 2.4 | −2.9 | 8.7 |
| g1 (BASELINE2) | NO | 89.6 | 96.6 | — | — | — |
| g1+g8 (LIKLIHOOD-SELECTED) | NO | 91.6 | 96.9 | 2.3 | −2.9 | 7.7 |

SPEECH RECOGNITION METHOD AND APPARATUS USING COARSE AND FINE OUTPUT PROBABILITIES UTILIZING AN UNSPECIFIED SPEAKER MODEL

BACKGROUND OF THE INVENTION

1. Field of the Invention

The present invention relates to a speech recognition method and an apparatus therefor, and more particularly to a speech recognition method for recognizing the input speech utilizing a model, and an apparatus therefor.

2. Related Background Art

Among the conventional speech recognition technologies, few employ models of plural speaker classes, and, even in case such models are employed, there is adopted a method of utilizing models divided into male and female speakers and selecting the model to be used prior to the execution of speech recognition. Thus, there has not been a method of utilizing an unspecified speaker model or utilizing a male model and a female model at the same time for speech recognition, and there has not existed a high-speed process utilizing such a method.

In the model preparation for speech recognition, it is generally known that higher performance of recognition can be obtained by forming details in the Hidden Markov Model (HMM) in the direction of phoneme environment. It is also becoming known that higher performance of recognition can be obtained by forming details in the direction of speaker classes, represented by genders. However, while the load of recognition process increases mainly in the output probability calculation of HMM in case of the detailed model formation in the direction of phoneme environment, the load increases both in the output probability calculation and in the language search in case of the detailed model formation in the direction of speaker classes. In speech recognition, it is desirable that speech recognition be performed in real time with a high recognition rate. It is therefore necessary to realize real-time speech recognition while improving the recognition rate thereof, and, for this purpose, it is necessary to realize a high-speed process utilizing speaker class models.

SUMMARY OF THE INVENTION

In consideration of the foregoing, the present invention is designed to enable high-speed speech recognition with a high recognition rate, by analyzing input speech, determining the output probability of models, namely an unspecified speaker model and plural speaker models clustered according to plural speaker classes, and the result of analysis of the input speech, and determining the result of recognition of the input speech based on the thus determined output probability.

DESCRIPTION OF THE PREFERRED EMBODIMENTS

Figure 1:
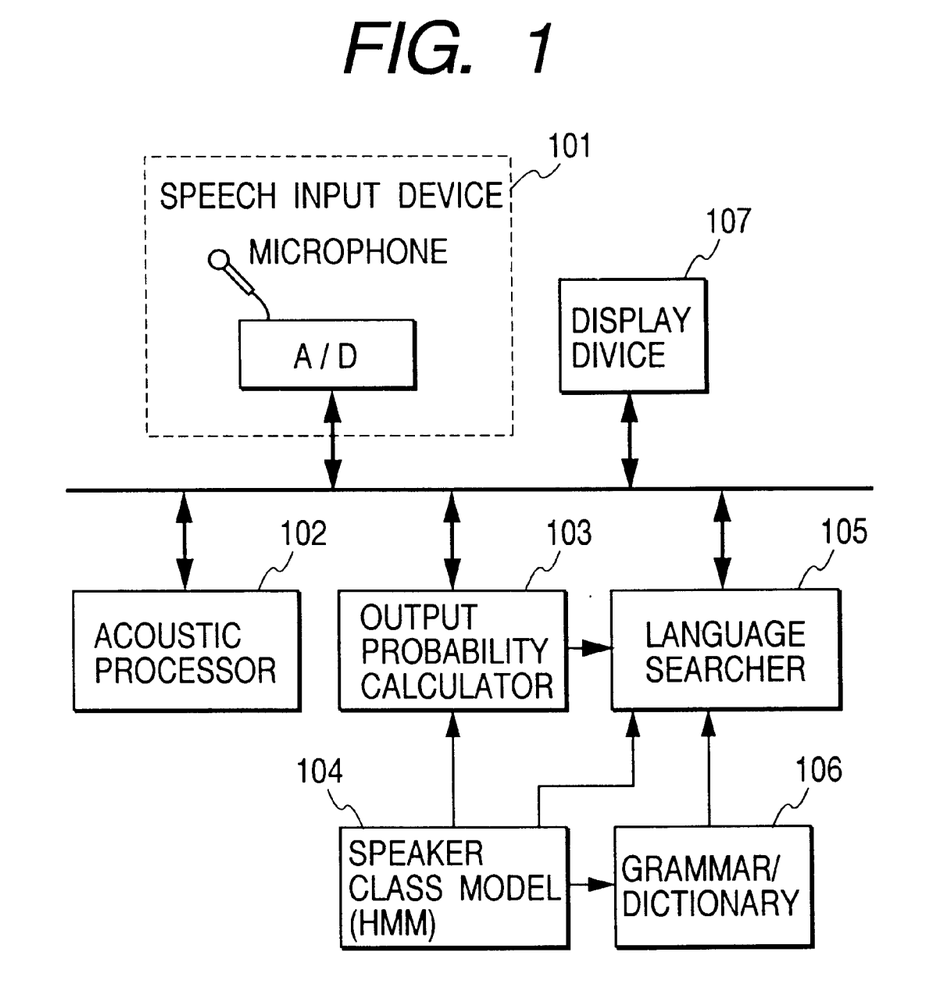
FIG. 1 is a functional block diagram of an embodiment of the present invention.

FIG. 1 is a functional block diagram of an apparatus embodying the present invention.

In FIG. 1 there are provided a speech input device 101 including a microphone or an A/D converter for entering the speech of an input speaker; an acoustic process unit 102 for determining speech parameters by acoustic analysis; an output probability calculation unit 103 for calculating a common coarse output probability and a fine output probability for each speaker class; a speaker class model (HMM: Hidden Markov Model) 104; a language search unit 105 for a common coarse language search and a fine language search for each speaker class; a grammar/dictionary unit 106 employed in the language processing; and a display device 107 for outputting the result.

Figure 8:
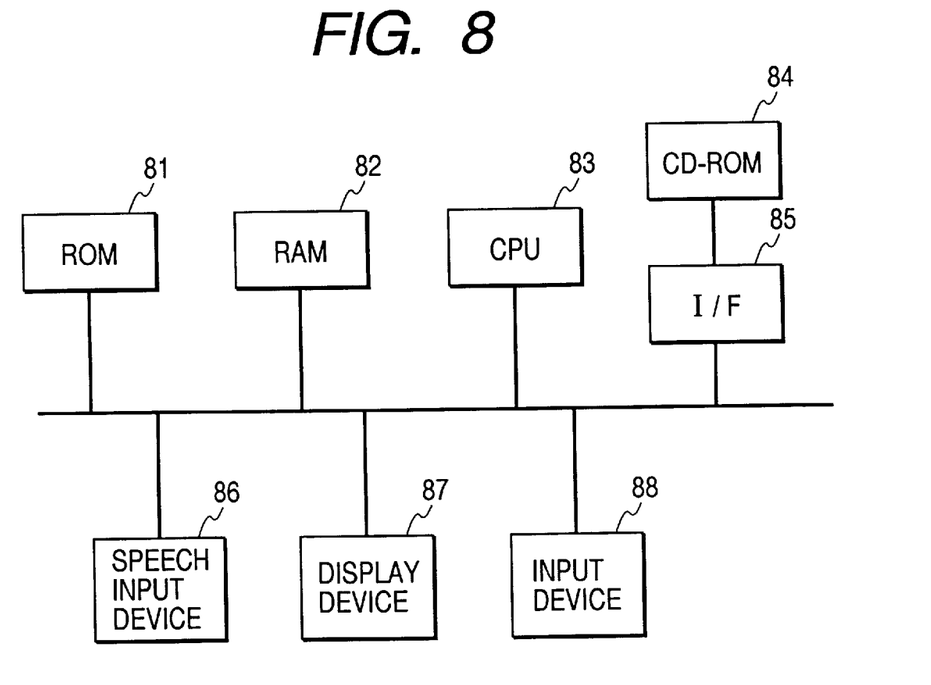
FIG. 8 is a block diagram showing a hardware configuration of an apparatus embodying the present invention.

FIG. 1 is a functional block diagram of a speech recognition apparatus embodying the present invention, while FIG. 8 shows the hardware configuration of such speech recognition apparatus and the functions of the blocks in FIG. 1 are realized by the components shown in FIG. 8.

More specifically, the function of the speech input device 101 is realized by a speech input device 86, and the functions of the acoustic process unit 102, the output probability calculation unit 103 and the language search unit 105 are realized under the control of a CPU 83 according to a control program stored in a ROM 81 or a RAM 82.

The speaker class HMM model 104 and the grammar/dictionary 106 are stored in the ROM 81 or the RAM 82. The control program, the HMM and the dictionary stored in the RAM 82 and the parameters required in various processes may be installed from a CD-ROM 84 through an interface (I/F) 85 or from another terminal (not shown) through a public communication line.

The display device 107 can be realized by a display device 87 such as a CRT or a liquid crystal display device, and various instruction can be entered by input means 88, such as a keyboard, a mouse and/or a tablet.

Figure 2:
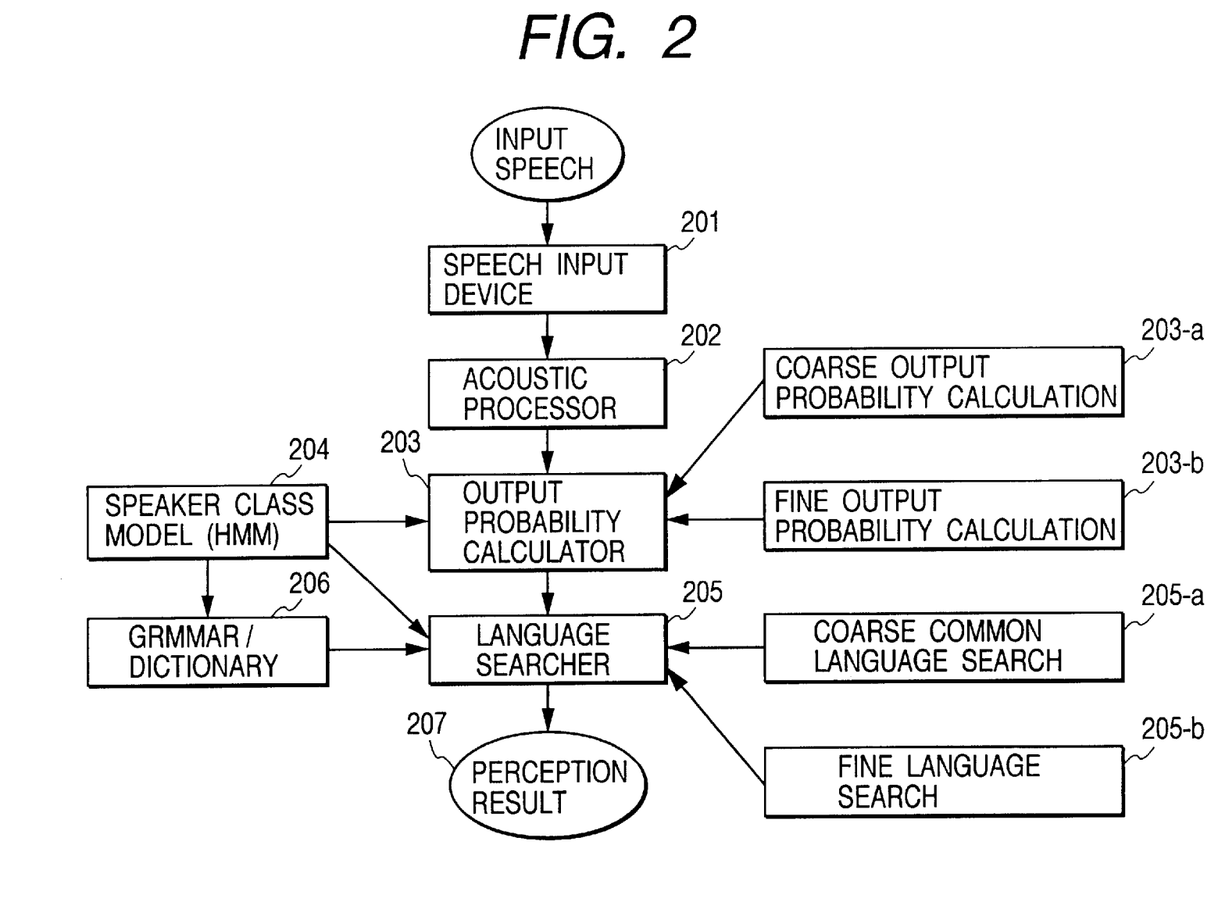
FIG. 2 is a flow chart showing the process flow in the embodiment of the present invention.

The speech recognition apparatus is composed of the above-mentioned components and functions according to the flow chart shown in FIG. 2. A speech cut out by the speech input device 201 (corresponding to 101) is analyzed into speech parameters in each frame by the acoustic process unit 202 (corresponding to 102), and the output probability calculation unit 203 (corresponding to 103) calculates the output probability utilizing the HMM 204 (corresponding to 104). The HMM 204 (corresponding to 104) stores speaker class models clustered into plural speaker classes. At the output probability calculation in 203, the output probability calculation unit at first calculates a common coarse output probability (203-a), and, based on the result of such a calculation, calculates again a fine output probability for each speaker class that may contribute to the result of recognition (203-b). Then a common output probability is determined from these output probabilities, and the language search unit 205 (corresponding to 105) executes a common language search based on the grammar/dictionary 206 (corresponding to 106) and the common output probability determined above, thereby determining a candidate of recognition (205-a). The language search unit 205 (corresponding to 105) then executes a fine language search for each speaker class, utilizing the fine output probability for each speaker class, thereby determining a recognition result and its likelihood (205-b). These results are outputted as the results of recognition on 207 (corresponding to 107).

[Method of preparation of high definition HMM in consideration of speaker classes]

In the following there will be explained methods of preparation of speaker classes and of speaker class HMM.

I. Method of preparation of speaker classes

In the following there will be explained the method of preparation of speaker classes. In a speaker class, speakers having acoustically similar features are clustered. The similarity of the acoustic features of the speakers can be measured by various methods, such as:

1) a method of considering the acoustic feature of each speaker as a distribution, preparing distributions for the respective speakers and measuring the similarity between the speakers by the distance between such distributions;

2) a method of representing an unspecified speaker space by plural representative points or distributions, determining the deviation of the representative points of each speaker in the unspecified speaker space, and measuring the similarlity between the speakers by such deviation; and 3) a method of preparing partial spaces for respective speakers in consideration of their sound property, making correspondence between such partial spaces in consideration of the sound property and measuring the similarity between the speakers by the sum of the similarities of the partial spaces.

The method (1) can be realized by studying the continuous HMM of one distribution for one state for each speaker, utilizing the entire speech space and measuring the similarity between the speakers by determining the distance of the HMM of the speakers. In this method, however, the average of the distribution of each speaker becomes a cepstrum means because the entire speech space of each speaker is represented by one distribution, so that the difference between the speakers may not become conspicuous. Consequently, this method cannot be considered preferable.

The method (2) can be realized by preparing a code book (for example of a code word size of 1024) of an unspecified speaker (namely studying the discrete distribution HMM of one state of 1024 code words), determining the probabilities of appearance of such code words for each speaker and measuring the similarity between the speakers by the deviation of such appearing probabilities. This method is preferable to the method (1) in that the speech space is divided into partial spaces. However, since this method does not take the sound property of the speakers into consideration, the measured similarity between the speakers may be based on the similarity between a sound of a speaker and another sound of another speaker, and this method cannot be considered preferable in consideration of such a possibility.

The method (3) can be realized by preparing models in consideration of the sound property for each speaker, and measuring the similarity between the speakers by the sums of the similarities of the corresponding models. For example phoneme HMM's of 1 distribution for 3 states are prepared for each speaker, and the similarity between the speakers is measured by determining the similarity in each corresponding state of each corresponding phoneme of the speakers and calculating the sum of such similarities. In this method, the similarity between the speakers is measured in consideration of the entire speech space of the speakers while making correspondence between the phoneme partial spaces represented by the phoneme and the state, and can therefore be given in consideration of the sound feature, also reflecting the detailed difference in the acoustic feature of each speaker. The similarity between the speakers can also be measured in a more detailed manner by replacing the phoneme model with a more detailed HMM dependent on the phoneme environment.

In consideration of the foregoing, the similarity between the speakers is determined by the above-explained method (3), and the speaker classes are prepared according to such similarity. In the following there will be explained the algorithm for preparing the speaker classes.

II. Algorithm of preparation of speaker classes

1) At first phoneme HMM's of 1 distribution for 3 states are prepared.

Considering 24 phonemes excluding the soundless state, each speaker is represented by 72 partial spaces (=24 phonemes×3 states). For example for 204 speakers, there are prepared 4,896 HMM's, and the total number of distributions becomes 14,688 (4,896×number of states (3)).

2) The similarity between the speakers is measured by the phoneme HMM's prepared for each speaker.

For two speakers $S^{(1)}$ and $S^{(2)}$, by defining states $\phi_p$, $\phi_q$ for a corresponding state n of a corresponding phoneme m among the phoneme HMM's (24 kinds), the similarity between such states is represented by a distance $d(\phi_p, \phi_q)$, wherein $\phi_p$, and $\phi_q$ are represented by:

$$\phi_p = \phi_{s_{mn}}{}^{(1)}, \phi_q = \phi_{s_{mn}}{}^{(2)} \qquad (1)$$

since each state is represented by one distribution, the distance $d(\phi_p, \phi_q)$ can be calculated according to the following equation (2), employing Bhattacharyya distance:

$$d(\phi_p, \phi_q) \frac{1}{8}(\mu_p - \mu_q)^t \left(\frac{\sum_p + \sum_q}{2}\right)^{-1}(\mu_p - \mu_q) + \frac{1}{2}\ln\frac{\left|\left(\sum_p + \sum_q\right)/2\right|}{|\sum_p|^{1/2}|\sum_q|^{1/2}} \qquad (2)$$

wherein $\mu_i$ and $\Sigma_i$ respectively stand for mean value and dispersion.

The distances of all the states of all the corresponding phonemes of the speakers are determined by the foregoing equation, and the similarity of the speakers is defined by the distance $D(S^{(1)}, S^{(2)})$ which is the sum of the above-mentioned distances. The distance $D(S^{(1)}, S^{(2)})$ is calculated by the following equation (3):

$$D(S^{(1)}, S^{(2)}) = \sum_{m=1}^{M} \sum_{n=1}^{N} d(\phi_p, \phi_q) \qquad (3)$$

wherein M indicates the number of kinds of HMM and N indicates the number of states per HMM.

The similarity is determined as explained above, for every two of all the speakers.

3) The speakers are clustered by an LBG algorithm, based on the similarities of all the speakers. The LBG algorithm is executed in the following procedure:

1. There is selected a central speaker, for whom the sum of the similarities for all the speakers becomes a minimum. The central speaker means a speaker for whom the sum of the similarities becomes a minimum in the contemplated class;

2. There is determined a speaker $S_a$ farthest from the central speaker within the contemplated class;

3. There is determined a speaker $S_b$ who is farthest from the above-mentioned far speaker $S_a$ within the contemplated class;

4. The speakers in the contemplated class are divided into a group closer to the speaker $S_a$ and another closer to the speaker $S_b$, thereby forming two speaker classes;

5. Central speakers $S_{a1}$, $S_{b1}$ are renewed respectively for the thus divided two speaker classes;

6. All the speakers are reclustered by assignment to the closest central speakers, utilizing all the currently determined central speakers (the number of which is same as the number of currently contemplated speaker classes). This step 6 is repeated while the renewal of the central speakers is continued, but the sequence proceeds to the next step 7 if the central speakers are no longer renewed. This step is terminated when a desired number of speaker classes is obtained; and 7. Among all the speaker classes, there is determined a class showing the largest sum of the similarities for the central speaker, and the foregoing steps 2, 3, 4, 5 and 6 are executed on such a class.

The speaker classes are prepared as explained in the foregoing. The prepared speaker classes may be utilized as they are, but the spreading of the speakers may be different in the different classes, according to the above-mentioned method of preparation. If it is desirable to have similar levels of spreading among the different speaker classes, it is possible to fetch, in succession, a closer speaker to each speaker class until the level of spreading (sum of similarities to the central speaker) of the class showing the widest spreading (i.e. having the largest sum of the similarities to the central speaker) becomes similar to the level of spreading of other classes. Such determination of the speaker classes provides uniform spreading of the speaker classes, and the speaker at the boundary belongs to plural speaker classes, so that the speech recognition can be relieved from the significant influence resulting from the error in the determination of the speaker classes.

III. Method of preparation of speaker class HMM

The phoneme environment-dependent HMM's are prepared by the ordinary EM algorithm, utilizing the speech data of the speakers belonging to each of thus prepared speaker classes. For example, in 4 speaker classes, there are prepared phoneme environment-dependent HMM's of 12 distributions in 3 states (238 kinds).

[High-speed speech recognition method utilizing speaker class HMM]

In the following there will be explained a high-speed speech recognition method utilizing speaker class HMM.

Figure 3:
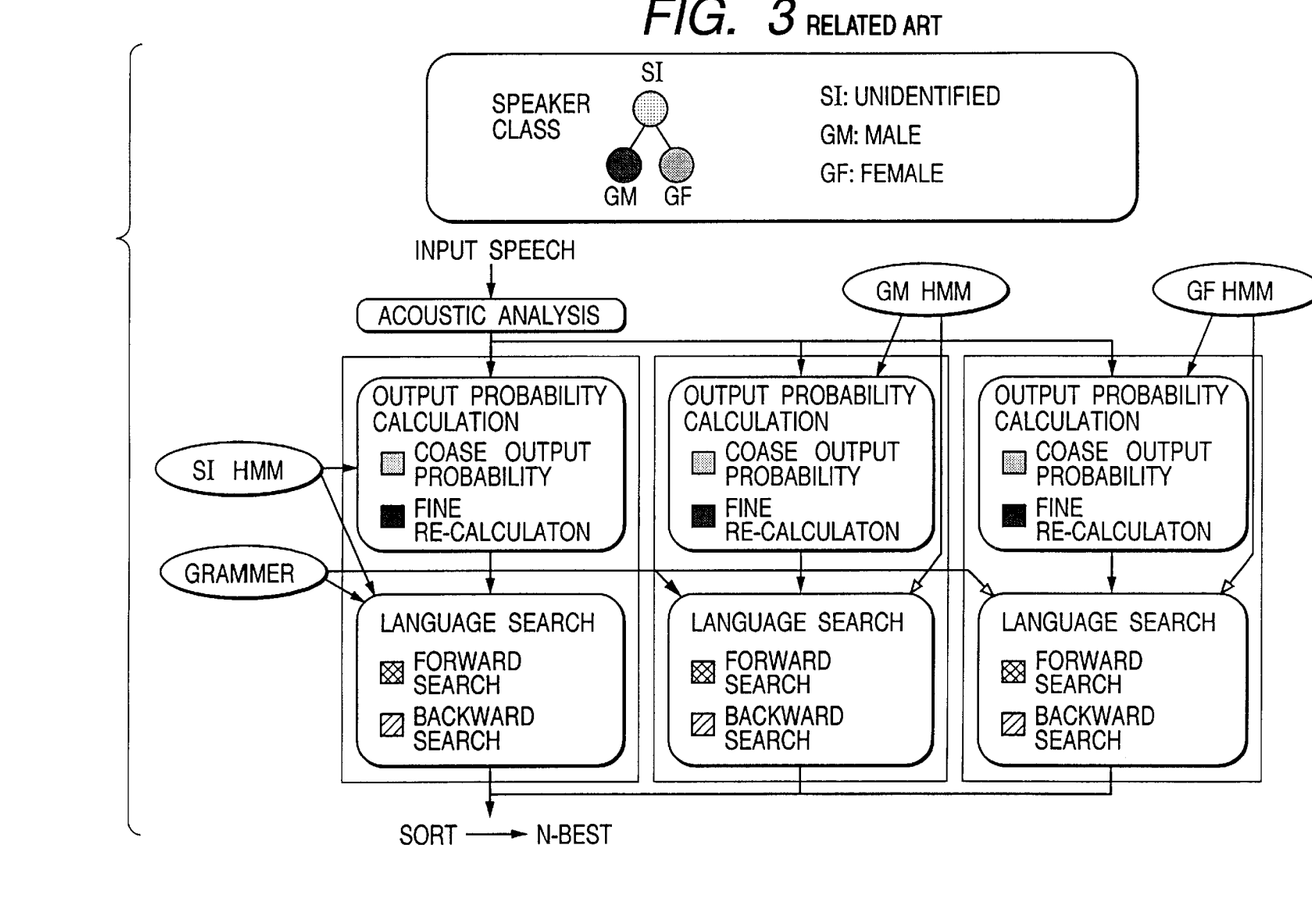
FIG. 3 is a view showing a conventional process utilizing speaker class models.

At first there will be explained, with reference to FIG. 3, a conventional speech recognition method utilizing speaker class HMM. In this case, there are basically conducted, in parallel manner, the speech recognition processes by the kinds (N) of the speaker class HMM'S, there is required speech processing of N times, in comparison with the case of employing only one speaker class, namely an unspecified speaker class HMM. Consequently, the output probability calculation and the language search required are also N times. If the calculations of such amount are necessary, the use of the speaker class HMM's in the actual speech recognition inevitably necessitates a computer of a very high speed or of parallel processing, in order to realize a real-time process. Such use therefore, becomes expensive and is practically unrealistic.

Figure 4:
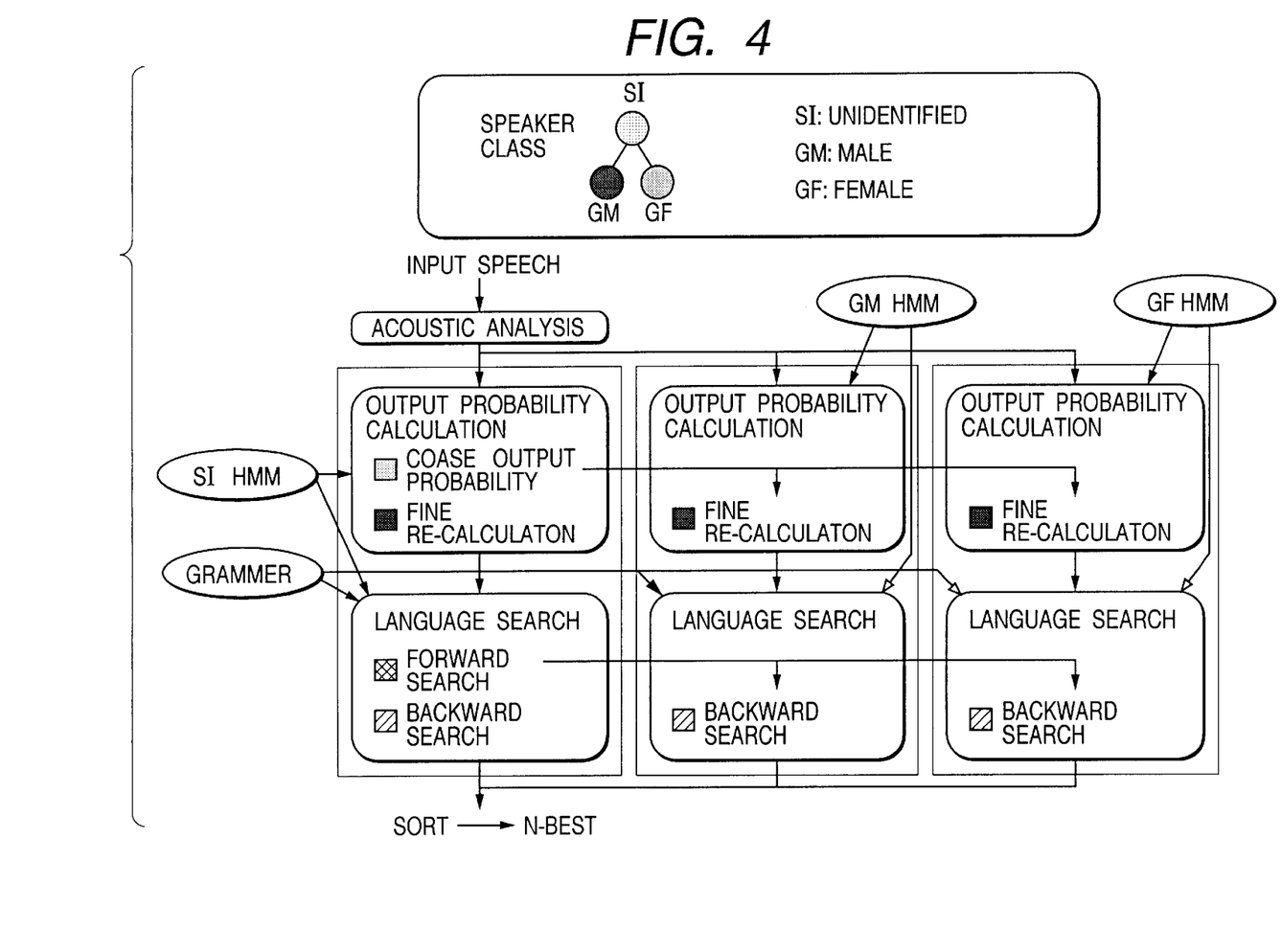
FIG. 4 is a view showing a high-speed process of the present invention utilizing speaker class models.

In the following there is proposed a speech recognition method utilizing the speaker class HMM's capable of significantly reducing the amount of the above-mentioned calculations. The proposed method is illustrated in FIG. 4. The proposed speech recognition process is featured by a fact that the unspecified speaker HMM is always used also in the recognition of the speaker class HMM. The unspecified speaker HMM corresponds to an upper speaker class of all the speaker class HMM's. It is intended to improve the efficiency of the output probability calculation and the language search, by employing the result of the unspecified speaker HMM as the estimated value of each speaker class HMM.

The proposed high-speed speech recognition method utilizing the speaker class HMM's functions in the following manner.

1) For the result of acoustic analysis, the estimated value of the state output probability of the unspecified speaker HMM (SI HMM) is calculated by the high-speed output probability calculation method IDMM+SQ, utilizing scaler quantization and dimensionally independent output probability calculation.

2) Assuming that the upper rank of the output probability of the unspecified speaker HMM, estimated by IDMM+SQ, is a state contributing to the result of recognition, the state output probability of each speaker class HMM is re-calculated, utilizing the unspecified speaker HMM and each speaker class HMM, to obtain a fine output probability. In this operation, since the unspecified speaker HMM constitutes the upper class of the speaker class HMM's a relatively high output probability can be expected in the unspecified speaker HMM in a state where a high output probability of the speaker class HMM is anticipated. Consequently the output probability of the unspecified speaker HMM, estimated by IDMM+SQ, may be employed as the state output probability of each speaker class HMM.

3) Subsequently there is executed a forward language search, utilizing the total output probability of the unspecified speaker HMM. In this case, the language search is not executed in other speaker classes. In the present speech recognition method, the final result of recognition is determined by a backward language search utilizing a tree-trellis-based search, based on an Astar search. The huristic cost of the Aster search utilizes the forward score of the unspecified speaker and does not require the forward Viterbi search for each speaker class. In this case, the huristic cost does not satisfy the condition of the Astar search in the strict sense, but in practice the difference scarcely matters if the final N-best results are re-sorted since the unspecified speaker HMM, constituting an upper class of the speaker class HMM's, provides a relative satisfactory estimated value for the huristic cost of the speaker class HMM's. The final N-best results have to be re-sorted in any case, since the results among plural speaker classes are employed.

4) Then the final result of recognition is determined by a backward language search for each speaker class. In this operation, the result of the forward language search of the unspecified speaker is used as the huristic cost of each speaker class, as explained above. In the backward Viterbi search, there is employed the output probability for each speaker class, estimated in the step (2).

5) The results of recognition, determined for the different speaker classes, are re-sorted, and the result of the highest likelihood is taken as the result of recognition of the first rank.

In the above-explained method, most of the calculations that may contribute to the result of recognition is made by the information relating to each speaker class.

Figure 5:
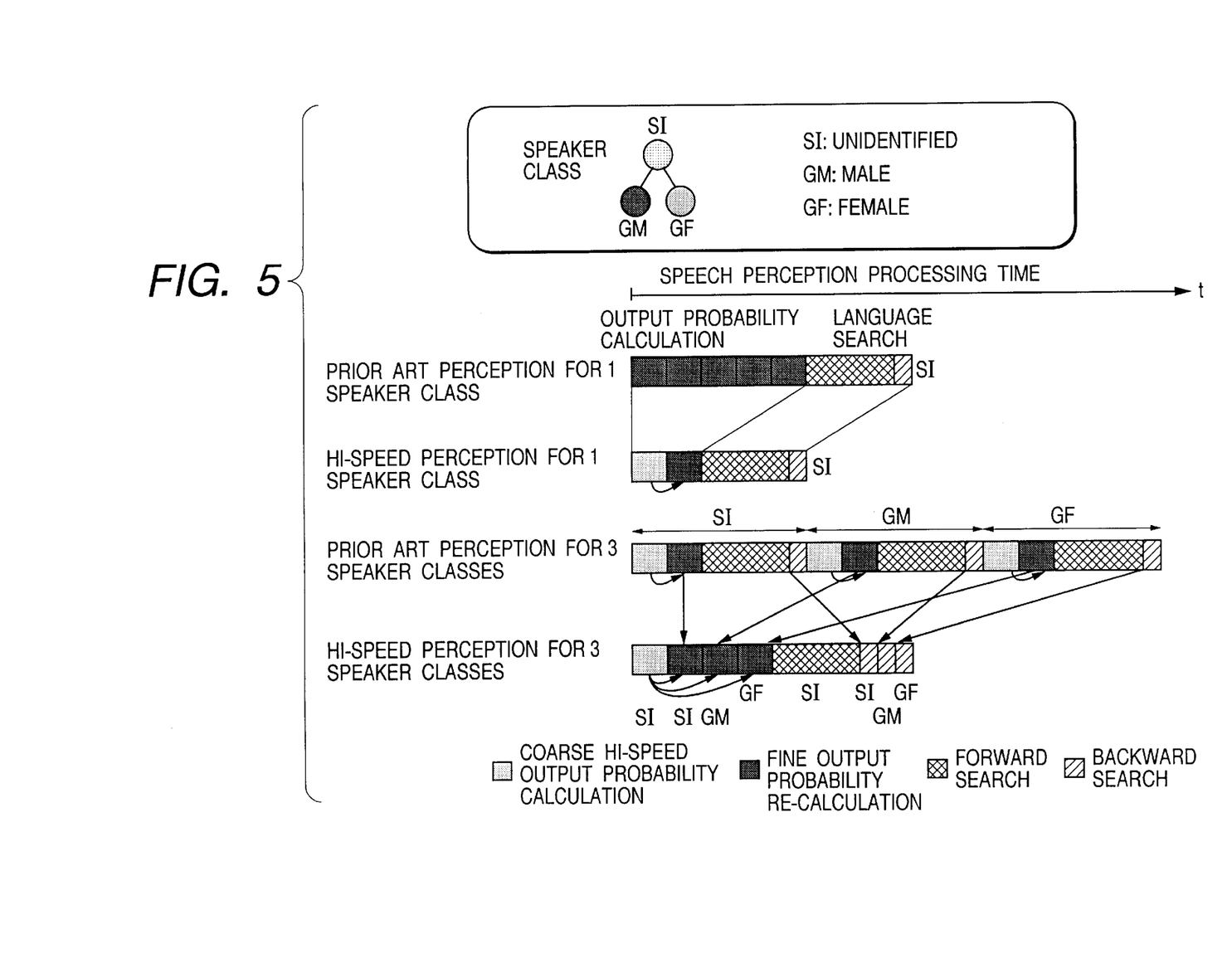
FIG. 5 is a view showing the comparison of process times.
Figure 6:
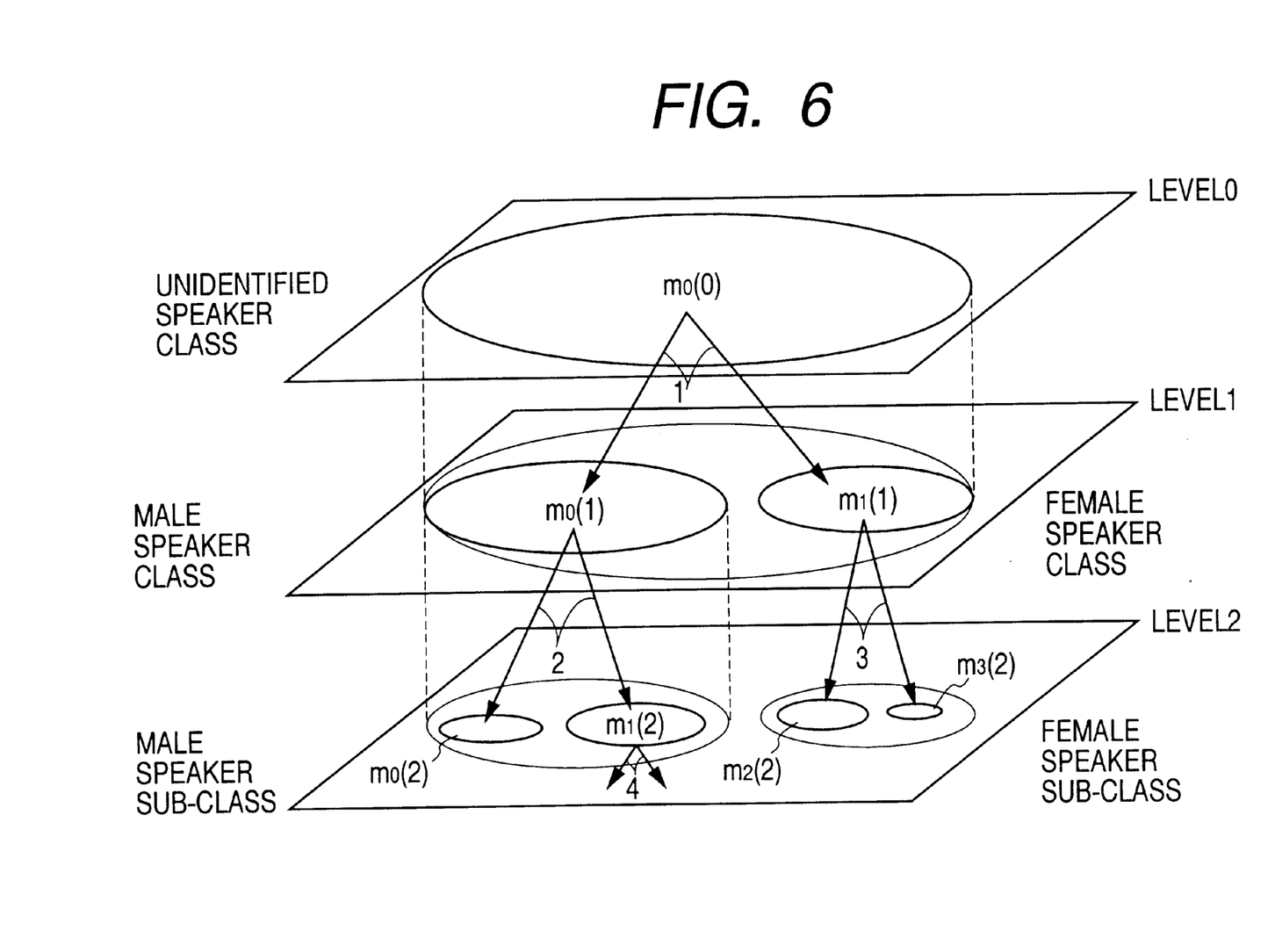
FIG. 6 is a view showing speaker classes having a hierarchical structure.

FIG. 5 schematically shows the comparison of the process time of the speech recognition employing the speaker class HMM, in the conventional method and in the method of the present invention, taking the process time along the abscissa. The uppermost graph shows the process time of the conventional recognition employing only one speaker class (unspecified speaker class), and the second graph shows the process time of the recognition employing an unspecified speaker class, made faster by IDMM+SQ (present invention). The third graph shows the process time of the conventional recognition employing IDMM+SQ and the speaker class HMM's of 3 speaker classes simply in a parallel manner (as shown in FIG. 3), while the lowermost graph shows the process time of the high-speed speech recognition method with 3 speaker classes, utilizing the proposed speaker class HMM's (as shown in FIG. 4). The process time required for the output probability calculation (Bjot) and the forward/backward language search is variable, depending on the task constituting the object of recognition and on the performance of HMM's, but can be considered to be represented as a reasonable length in the contemplated range. However the process time required for the backward language search, represented as considerably long in these graphs, is less than 0.1 seconds in practice.

As a result, in comparison with the conventional method of calculating the speaker class HMM's simply in a parallel manner and executing the IDMM+SQ calculation and the forward Viterbi search by the number N of the speaker classes, the proposed method requires the IDMM+SQ calculation for the unspecified speaker HMM and the forward search only once, so that the advantage of the proposed method becomes larger with the increase in the number N. On the other hand, the amount of the output probability re-calculation for the speaker classes and of the backward language search, increasing with the number N of the speaker classes, is limited in the entire calculations. Consequently the method of the present invention can be executed, in the entire process, at a very high speed.

As a result, there is provided an increased possibility of realizing a real-time process without relying on a high-speed computer or parallel computers, and a practical speech recognition can be realized.

[Experimental results on speech recognition with speaker class HMM'S]

Figure 7:
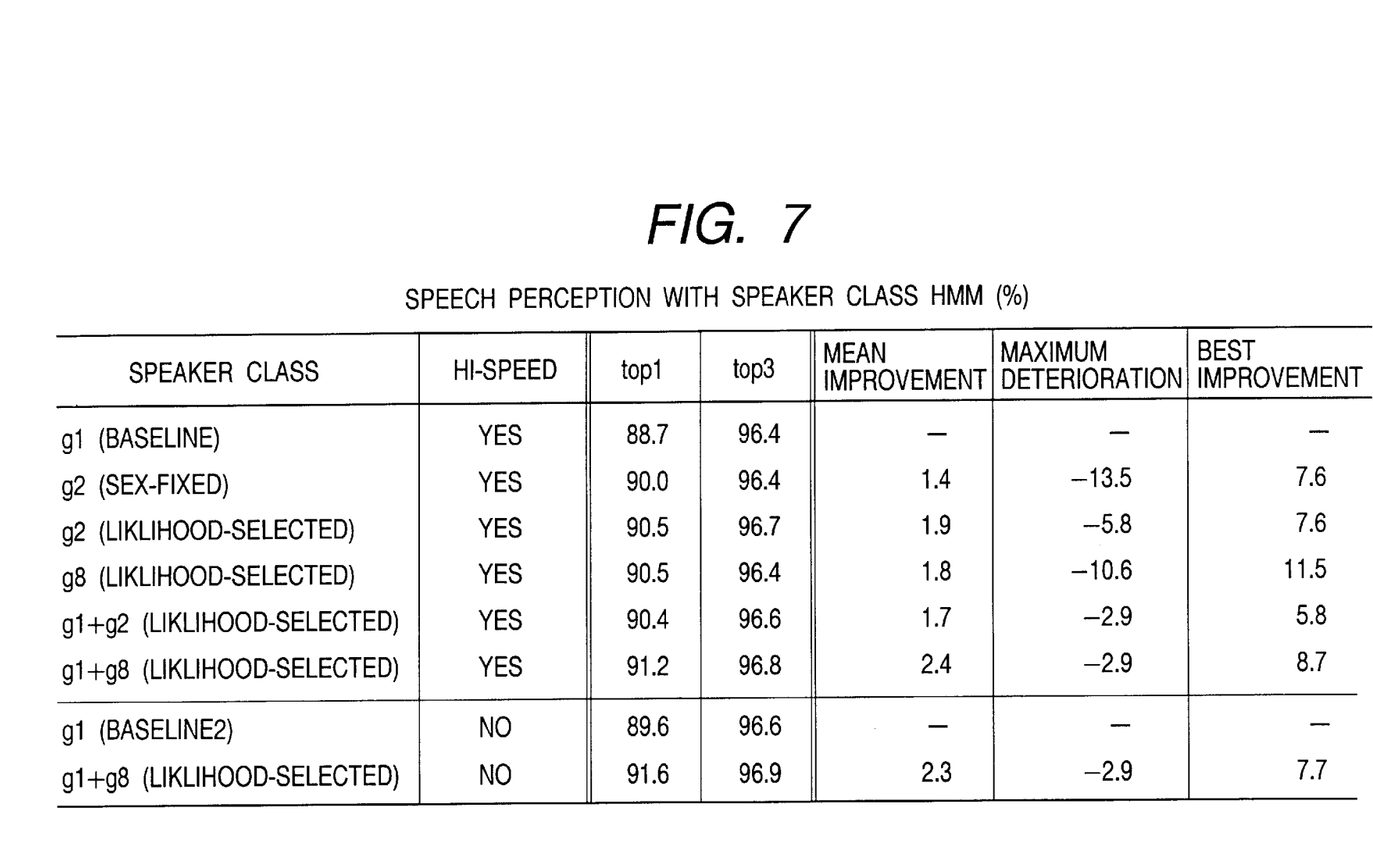
FIG. 7 is a chart showing the results of recognition of telephone speech, utilizing speaker classes.

The results of an experiment conducted with plural speaker classes are shown in FIG. 7. The speech recognition was experimented with (a) an unspecified speaker class (g1), (2) male and female speaker classes (g2), and (3) 8 speaker classes consisting of four male classes and four female classes (g8). Phoneme environment-dependent HMM's of 6 distributions for 3 states were prepared for each of the above-mentioned speaker classes (1)–(3) (238 kinds in total), and a recognition experiment was conducted for 520 words (telephone speeches) pronounced by twenty male and female speakers.

The experimental results in FIG. 7 indicate the effect of the use of the speaker classes. According to these results, the case utilizing the unspecified speaker class in combination with the speaker classes suppressed the percentage of maximum deterioration and increased the percentages of maximum improvement and of mean improvement.

In the foregoing there has been explained a case of employing the unspecified speaker class and the male and female speaker classes, but there may also be employed a larger number of the speaker classes.

Also in the foregoing there has been explained a case of utilizing the unspecified speaker class in the common output probability calculation, but there may also be employed any parameter that can be determined from the output probability values of the speaker classes. For example, there may be employed the maximum value of the output probabilities of the speaker class HMM's.

Furthermore, in the foregoing there has been explained a case of utilizing IDMM+SQ in the calculation of the coarse output probability, but there may also be employed a method of employing HMM of a smaller population for the coarse output probability calculation and employing HMM of a larger population for the fine output probability calculation, or a method of employing phoneme HMM for the coarse output probability calculation and employing phoneme environment-dependent HMM for the fine output probability calculation.

Furthermore, in the foregoing there has been explained a case of doubling the number of the speaker classes for each hierarchic level, but the number of the speaker classes may be increased in any manner.

Furthermore, in the foregoing there has been explained a case of clustering the speakers in such a manner that the speakers do not overlap between the different classes, but the clustering may also be made so as to allow such overlapping.

What is claimed is:

1. A speech recognition method comprising the steps of:
   entering speech;
   calculating a coarse output probability of said input speech, utilizing an unspecified speaker model;
   estimating a state that is likely to contribute to a result of recognition, based on a result of said calculation step and determining a fine output probability of said input speech, utilizing said unspecified speaker model and plural speaker models clustered into plural speaker classes for the estimated states; and
   determining the result of recognition of said input speech, based on said fine output probability.

2. A speech recognition method according to claim 1, wherein said speaker classes are prepared in a hierarchic structure in such a manner that each speaker belongs, in a specified hierarchic level, to plural speaker classes or to a speaker class.

3. A speech recognition method according to claim 1, wherein said speaker classes are prepared by the steps of:
   preparing models respectively corresponding to sound properties from the input speech;
   determining a speaker class to which said input speech belongs, according to the distance from said prepared models; and
   memorizing the model of said input speech as said determined speaker class.

4. A speech recognition method according to claim 3, wherein said model prepared for each sound property is a phoneme Hidden Markov Model.

5. A speech recognition method according to claim 3, wherein said models for respective sound properties are phoneme models, and the sum of the distances between the models, in mutually corresponding states of the phoneme models used for calculating said distance of the models, is used as the distance between the models for determining said speaker class.

6. A speech recognition method according to claim 3, wherein a Bhattacharyya distance is used as said distance between the models.

7. A speech recognition method according to claim 3, wherein a Kullback information amount is used as said distance between the models.

8. A speech recognition method according to claim 3, wherein an Euclid distance is used as said distance between the models.

9. A speech recognition method according to claim 1, wherein:

a language search is conducted according to the result of calculation of said fine output probability and a judgment according to predetermined language limitation; and the result of said language search is outputted as the result of recognition of said input speech.

10. A speech recognition method according to claim 9, wherein, in said output probability calculation and language search:

the output probability calculation of a portion to be calculated in common is conducted by a forward search; and the result of recognition of said input speech is determined by executing the output probability calculation in portions other than said portion to be calculated in common by a backward search, for each of the unspecified speaker model and the models of the clustered speaker classes.

11. A speech recognition method according to claim 9, wherein, the language search for said plural speaker class models comprises the steps of:

determining a predetermined output probability based on the output probability determined at each time of plural speaker classes; and executing a common language search based on said predetermined output probability.

12. A speech recognition method according to claim 11, wherein said predetermined output probability is taken as the output probability of the unspecified speaker.

13. A speech recognition method according to claim 11, wherein said predetermined output probability is taken as the maximum value in the output probabilities of the speaker classes.

14. A speech recognition method according to claim 1, wherein said unspecified speaker model is taken as an upper hierarchic model of said speaker models.

15. A speech recognition method according to claim 1, wherein a fine re-calculation of said output probability is executed for all the speaker models.

16. A speech recognition method according to claim 1, wherein the calculation of the result of analysis of said input speech and of the output probability of the unspecified speaker model is executed, utilizing a scaler quantization and dimensionally independent high-speed output probability calculation method for a Hidden Markov Model.

17. A speech recognition apparatus comprising:

input means for entering speech;

coarse output probability calculation means for calculating a coarse output probability of said input speech, utilizing an unspecified speaker model;

fine output probability calculation means for estimating a state that is likely to contribute to a result of recognition, based on a result of calculation by said coarse output probability calculation means and determining a fine output probability of said input speech, utilizing said unspecified speaker model and plural speaker models clustered into plural speaker classes for the estimated states; and recognition result determination means for determining the result of recognition of said input speech based on said fine output probability.

18. A speech recognition apparatus according to claim 17, wherein said speaker classes are prepared in a hierarchic structure in such a manner that each speaker belongs, in a specified hierarchic level, to plural speaker classes or to a speaker class.

19. A speech recognition apparatus according to claim 17, further comprising:

sound property model preparation means for preparing models respectively corresponding to sound properties from the input speech;

speaker class determination means for determining a speaker class to which said input speech belongs, according to the distance from said prepared models prepared by said sound property model preparation means; and speaker model preparation means for memorizing the model of said input speech as the speaker class determined by said speaker class determination means, thereby preparing a speaker model for the input speech.

20. A speech recognition apparatus according to claim 19, wherein said model prepared for each sound property is a phoneme Hidden Markov Model.

21. A speech recognition apparatus according to claim 19, wherein said models for respective sound properties are phoneme models, and the sum of the distances between the models, in mutually corresponding states of the phoneme models used for calculating said distance of the models, is used as the distance between the models for determining said speaker class.

22. A speech recognition apparatus according to claim 19, wherein a Bhattacharyya distance is used as said distance between the models.

23. A speech recognition apparatus according to claim 19, wherein a Kullback information amount is used as said distance between the models.

24. A speech recognition apparatus according to claim 19, wherein an Euclid distance is used as said distance between the models.

25. A speech recognition apparatus according to claim 17, further comprising:

language search means for conducting a language search according to the result of calculation of said fine output probability and a judgment according to a predetermined language limitation;

wherein said recognition result determination means determines the result of searching by said language search means as the result of recognition of said input speech.

26. A speech recognition apparatus according to claim 25, wherein said language search means executes the output probability calculation of a portion to be calculated in common by a forward search, and executes the output probability calculation in portions other than said portion to be calculated in common by a backward search, for each of the unspecified speaker model and the models of the clustered speaker classes.

27. A speech recognition apparatus according to claim 25, wherein said language search means, in the language search for said plural speaker class models, determines a predetermined output probability based on the output probability determined at each time of plural speaker classes, and executes a common language search, based on said predetermined output probability.

28. A speech recognition apparatus according to claim 27, wherein said predetermined output probability is taken as the output probability of the unspecified speaker.

29. A speech recognition apparatus according to claim 27, wherein said predetermined output probability is taken as the maximum value in the output probabilities of the speaker classes.

30. A speech recognition apparatus according to claim 17, wherein said unspecified speaker model is taken as an upper hierarchic model of said speaker models.

31. A speech recognition apparatus according to claim 17, wherein a fine re-calculation of said output probability is executed for all the speaker models.

32. A speech recognition apparatus according to claim 17, wherein the calculation of the result of analysis of said input speech and of the output probability of the unspecified speaker model is executed, utilizing a scaler quantization and dimensionally independent high-speed output probability calculation method for a Hidden Markov Model.

* * * * *

UNITED STATES PATENT AND TRADEMARK OFFICE
CERTIFICATE OF CORRECTION

PATENT NO. : 6,108,628
DATED : August 22, 2000
INVENTOR(S) : Yasuhro Komori, et al.

It is certified that error appears in the above-identified patent and that said Letters Patent is hereby corrected as shown below:

Title page,
Item [56], References Cited, Other Publications: "Kosaka et al., "Tre Structured Speaker Clustering for Fast Speaker Adaptation Proceedings of ICCASSP", vol. 1, pp. 1245-1248, Apr. 1994." should be deleted.

Drawings,
Sheet 1, Figure 1, "DIVICE" should read -- DEVICE --.
Sheet 2, Figure 2, "GRMMAR/" should read -- GRAMMAR/ --.
Sheet 3, Figure 3, "COASE" (all three occurrences) should read -- COARSE --; and "GRAMMAR" should read -- GRAMMAR --.
Sheet 4, Figure 4, "COASE" should read -- COARSE --; and "GRAMMAR" should read -- GRAMMAR --.
Sheet 7, Figure 7, "(LIKLIHOOD-SELECTED)" (all five occurrences) should read -- (LIKELIHOOD-SELECTED) --.

Column 2,
Line 42, "instruction" should read -- instructions --.

Column 6,
Line 64, "is" should read -- are --.

Column 9,
Line 22, "wherein," should read -- wherein --.

Signed and Sealed this

Twenty-third Day of October, 2001

*Attest:*

NICHOLAS P. GODICI
*Attesting Officer*  Acting Director of the United States Patent and Trademark Office